United States Patent [19]
Wilson

[11] 3,970,101
[45] July 20, 1976

[54] FLOAT CONTROLLED VALVE ASSEMBLY

[75] Inventor: Robert M. Wilson, Battle Creek, Mich.

[73] Assignee: Dare Products, Incorporated, Battle Creek, Mich.

[22] Filed: Mar. 17, 1975

[21] Appl. No.: 559,218

[52] U.S. Cl. ................................ 137/216; 137/434
[51] Int. Cl.² ......................................... F16K 24/02
[58] Field of Search ........................... 137/216, 434

[56] References Cited
UNITED STATES PATENTS

| | | | |
|---|---|---|---|
| 2,890,711 | 6/1959 | Parker | 137/434 |
| 3,286,724 | 11/1966 | Sawyer | 137/434 |
| 3,485,261 | 12/1969 | Reitman | 137/216 |

Primary Examiner—Henry T. Klinksiek
Attorney, Agent, or Firm—Fisher, Gerhardt & Groh

[57] ABSTRACT

A float controlled valve assembly in which the valve is located in spaced relationship to the float with vent means being provided in between and above the level of a liquid receiving tank to provide an anti-siphoning arrangement. The valve is operated by an actuator which is suspended independently of the float but is movable in response thereto. The actuator is supported and guided for both axial and rotational movement which maintains friction between the actuator and the float at a minimum and also minimizes and maintains uniform and minimum wear between the co-acting valve parts.

5 Claims, 5 Drawing Figures

FLOAT CONTROLLED VALVE ASSEMBLY

BACKGROUND OF THE INVENTION

This invention relates to a valve assembly and more particularly to a float controlled valve assembly having a siphon breaker.

This invention is an improvement over the inventions disclosed and claimed in my prior U.S. Pat. Nos. 3,176,707 and 3,270,770.

It is highly desirable and in certain localities, mandatory by law to make provision to prevent siphoning of liquid from a receptacle such as a watering tank or trough back through the lines delivering the liquid such as water to the tank.

Siphoning is prevented by forming a vent between the point at which liquid is delivered and the maximum water level of the receptacle which normally is defined by an overflow pipe. My prior patents provided such vents, but it is possible for the float controlled valve assemblies to be improperly or carelessly installed so that the vents are located below the overflow level of the tank making them ineffective to break any siphoning action which might occur through the delivery line.

The location of the vacuum or siphon breaking means above the height of the maximum water line, requires locating the valve remotely from the float actuating the valve and which must necessarily be immersed in the water. This creates problems of valve actuation which must be simply and economically solved.

SUMMARY OF THE INVENTION

It is an object of the invention to provide a float control valve assembly in which an anti-siphon vent is formed between the valve and the float in a position preventing emersion in liquid.

Another object of the invention is to provide a float controlled valve assembly in which the inlet valve is disposed remotely from the float and in which an actuating member between the latter and the valve is freely movable to insure movement of the valve in response to movement of the float.

A float control valve assembly has been provided in which an inlet valve is located remotely from an actuating float with anti-siphon vent means being formed between the valve and the float and above the maximum liquid level, the valve being actuated in response to movement of the float by an actuating member which is freely movable relative to the float both axially and rotationally to minimize friction between the float and valve actuating mechanism. The actuating arrangement is provided with guide means which insures proper alignment of the actuating member relative to the valve and also relative to the movable float mechanism.

DETAILED DESCRIPTION

Figure 1:
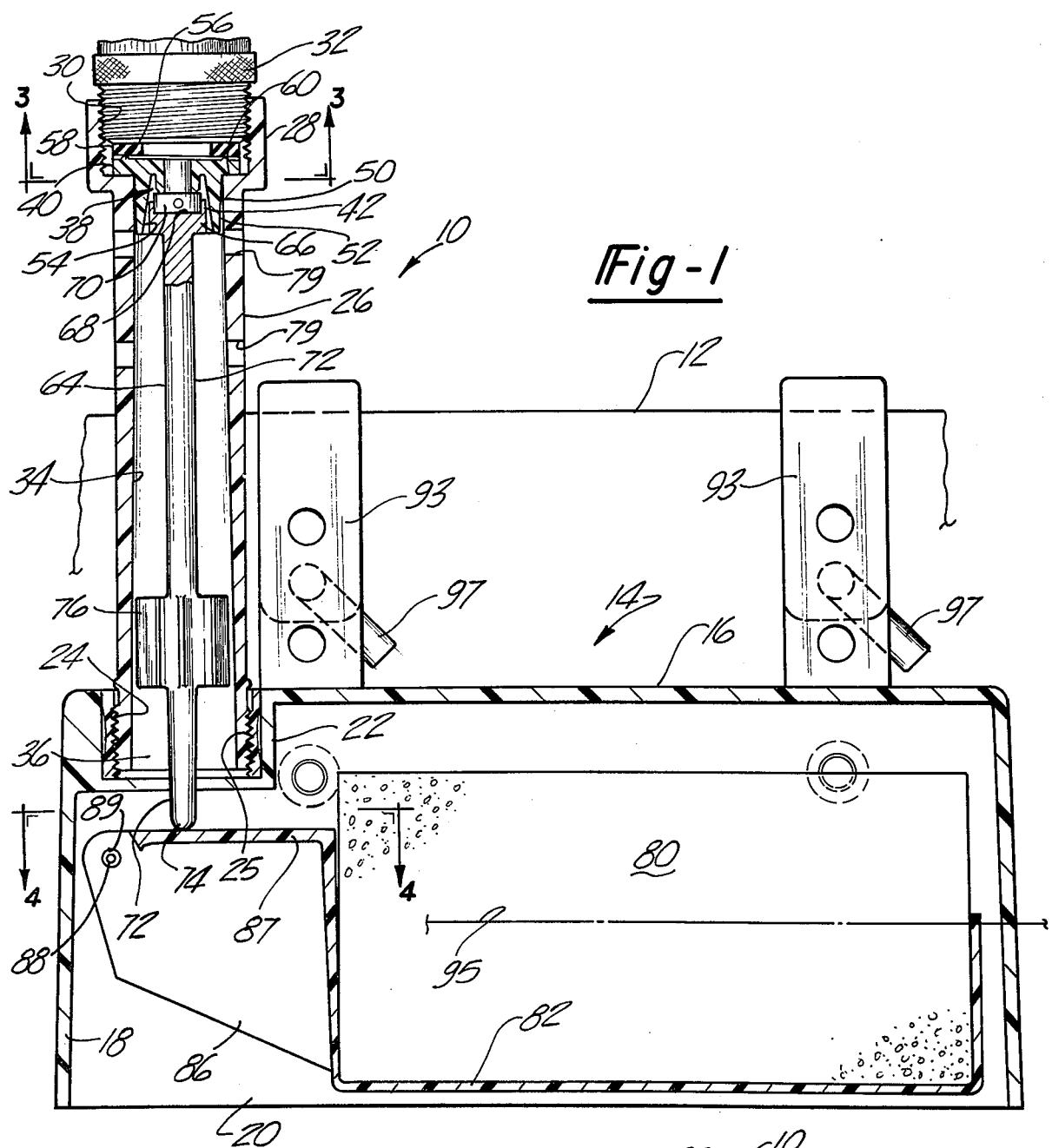
FIG. 1 is a cross sectional view of the float controlled valve assembly embodying the invention.

A float controlled valve assembly embodying the present invention is designated at 10 and is adapted to be mounted within a watering tank, an upper rim of which is indicated at 12.

The valve assembly 10 includes a housing 14 which preferably is made of a plastic material and has a generally rectangular or box-like configuration with a closed top portion 16, sidewalls 18 and an open bottom portion 20. A boss 22 is formed within the housing 14 and adjacent an upper corner formed between the top 16 and one of the side walls 18. The boss 22 has internal pipe threads 24 which receive conventional external pipe threads 25 on a conduit member 26.

The conduit member 26 rises vertically from the top 16 of the housing 14 and its upper end forms a slightly enlarged collar portion 28. The collar 28 is provided with internal threads 30 which receive the external threads of a fitting portion 32 forming the end of a liquid delivery pipe or hose. The collar 28 forms a liquid inlet for receiving liquid which is delivered through the internal bore 34 of the conduit 26 to a liquid outlet 36 formed by the open lower end of the conduit 26.

Figure 3:
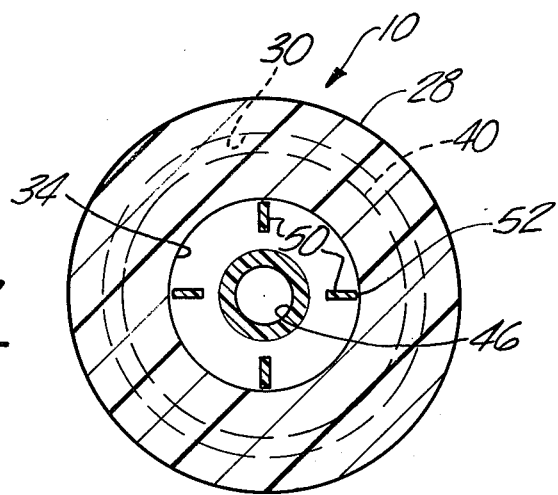
FIG. 3 is a sectional view of a valve seat member taken on line 3—3 in FIG. 1.

The upper end of the conduit 26 is provided with a control valve mechanism 38 which includes a valve seat member 40 and a valve closure member 42. The valve seat member 40 has a disc shaped body portion having a central aperture 46 surrounded by an annular lip 48. At the underside of the body portion are a plurality of depending guide elements 50 which as seen in FIG. 3 are spaced radially from the aperture 46. Preferably at least three or as shown, four such guide elements 50 are employed. Referring again to FIG. 1, exterior edge surfaces 52 of the guide elements 50 conform generally to the interior dimension of the bore 34 and facilitate insertion of the seat member 40 and maintain it axially in the bore 34. Radial inner edges 54 of the guide elements 50 diverge downwardly away from each other and form guide surfaces for engaging and guiding the valve closure member 42 during its movement relative to the valve seat member 40.

The upper surface of the body portion is provided with an annular bead 56 adjacent to the peripheral edge of the body member 44. The annular bead 56 is adapted to be engaged by a sealing washer 58 which is maintained in sealing engagement with the bead 56 by the fitting 32 of the water inlet pipe or hose. Such engagement serves to hold the closure member 42 in tight engagement with a shoulder 60 formed at the juncture of the bore 34 with the cavity in the collar 28.

The valve closure member 42 is formed at the upper end of a valve actuator 64 which extends generally axially through the entire length of the bore 34. The upper end of the actuator 64 has a head portion 66 forming a recess 68 which supports a rubber-like seal element 70. The seal element 70 is adapted to engage the annular seat or lip 48 to close the opening 46 to prevent liquid flow to the outlet of the conduit 26.

The actuator 64 includes a rod-like portion 72 which extends downwardly from the head portion 66 and has a semispherical lower end portion 74 which is disposed below the liquid outlet 36 formed at the lower end of the conduit 26. Movement of the rod-like actuating member 64 axially of the conduit 26 serves to open and close the valve mechanism formed by the valve closure member 42 and valve seat member 40 so that the flow of liquid is either permitted or prevented from flowing through the opening 46.

During movement of the valve actuator between open and closed position of the valve, the valve actuator 64 is guided at its upper end by engagement of the head portion 66 with the angularly disposed edge surfaces 54 so that in the closed position of the valve shown in FIG. 1, the annular seat 48 is axially aligned with the valve seal element 70.

The lower end of the actuator member 64 is provided with a plurality of fin-like portions 76 which extend radially from the rod portion 72 into close proximity with the walls of the bore 36 for engagement with the latter to guide the lower portion of the actuator rod 72. In this manner, spaced portions of the valve actuator 64 are guided by the head portion at the upper end and by the fin portions 76 at the lower end so that during opening and closing movement of the valve element 70 on the annular seat 48 the rod-like portion 64 is maintained in axial alignment with the bore 36 of the conduit 26. This insures good seating of the valve element 70 and valve seat or lip 48. Such guiding and alignment also insures an axial location of the spherical end portion 66 relative to the conduit 26.

Figure 5:
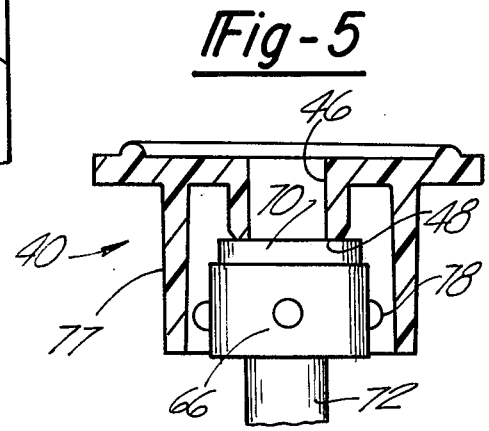
FIG. 5 is a cross sectional view showing a modification of the guide arrangement associated with the valve.
Figure 4:
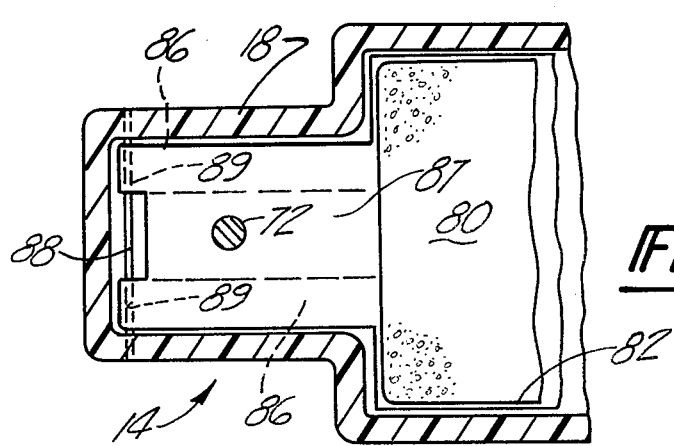
FIG. 4 is a view taken generally on line 4—4 in FIG. 1.

A modified form of guiding arrangement is shown in FIG. 5, in which the valve seat member 40 is provided with an annular, tube-like skirt 77 instead of the guide element 50 shown in FIGS. 1 and 3. In this arrangement, the head 66 of the actuator is provided with a plurality of protrusions 78 which have semi-spherical outer surfaces. The protrusions 78 are engageable with the inner walls of the tubular skirt 77 to maintain the actuator head 66 in axial alignment with the annular lip 48 forming the valve seat.

As best seen in FIG. 1, conduit member 26 is provided with a vent arrangement formed by radially extending holes 79 which communicate the bore 34 with the exterior of the conduit 26 to maintain the bore 34 at atmospheric pressure. The holes 79 serve as vacuum breakers which will prevent siphoning from the tank through the conduit 26 in the event that the valve fails in its open position and a sub-atmospheric pressure condition is established in the delivery line and fitting 32. The holes 79 are disposed below the seat member 40 and above the rim 12 of a liquid containing tank. As a result even if an overflow arrangement below the rim 12 of the tank should become obstructed, a vent arrangement is available which cannot be closed by liquid. In the preferred arrangement a pair of diametrically opposed holes 79 are disposed below the guide elements and another pair of holes 79 are disposed slightly below the first pair of holes.

Disposed within the housing 14 is a float assembly 80 which is similar to that shown in my prior U.S. Pat. No. 3,270,770. The float assembly 80 includes a tray member 82 which is generally box-like and is open to receive a block of float material 84 such as beaded plastic foam which has a low density. The float material 84 is cut to fit within the tray 82 and is retained therein by means of an adhesive or fasteners.

One end of the float tray 82 is provided with a pair of generally parallel, spaced bracket members 86 which merge with an end wall of the tray 82 and are rigid therewith. The upper end of the brackets 86 are joined by a web portion 87 which also merges with an end wall of the tray 82. The bracket members 86 are pivoted to the housing 14 by means of a pivot pin 88 which passes through aligned openings 89 in the brackets 86 and has its opposite end supported in opposite side walls 18 of the housing 14. Upon changes in liquid level in the tank, the float 80 moves about the pivot pin 88 and the web 87 forms a platform for engaging the semi-spherical end 74 of the valve actuator 64 to move the latter and cause opening and closing of the valve formed by the seat 48 and the element 70. The actuator 64 is free to rotate during its axial movement in the conduit 26 which insures easy movement and makes for uniform and minimal wear of the valve element 70 and the annular seat 48.

Figure 2:
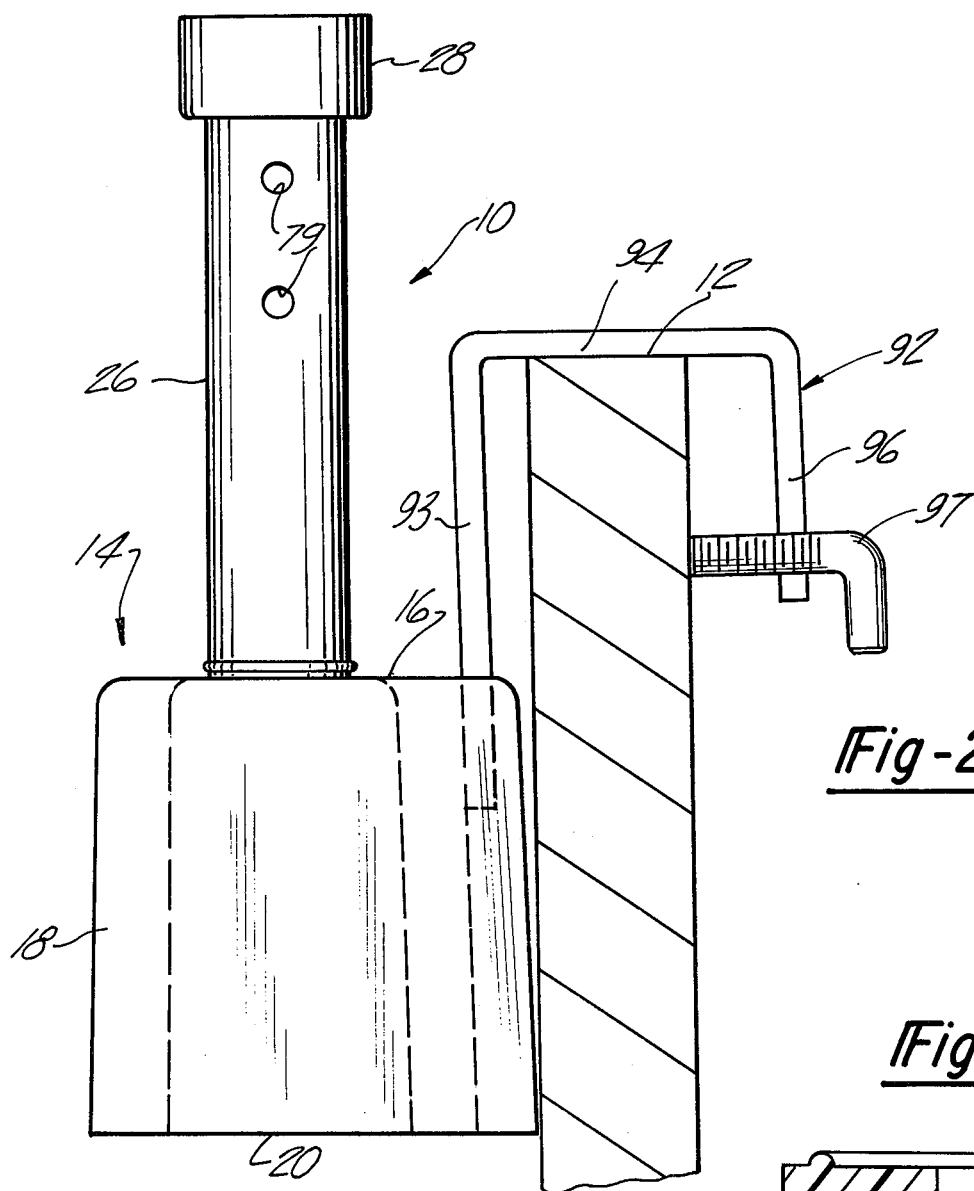
FIG. 2 is an end view showing the float controlled valve assembly attached to the wall of a tank.

The float valve assembly 10 is provided with a pair of brackets 92 for positioning and securing the assembly 10 relative to the upper rim 12 on the wall of the liquid container, such as a watering tank. As best seen in FIG. 2, the brackets 92 are generally U-shaped in configuration with one leg 93 of each of the brackets embedded in the plastic material forming the housing 14 or detachably connected thereto in a conventional manner by bolts or the like. The bight portions 94 of the U-shaped brackets are adapted to rest on the upper lip 12 of the tank to suspend the housing 14 below the lip 12 to a position in which the float will be supported by the liquid when it reaches its maximum desired level as indicated by the line 95 in FIG. 1. The other legs 96 of the U-shaped brackets are provided with lock screws 97 which may be threaded into engagement with the wall of the tank to secure the brackets 92 and therefore, the housing 14 in a fixed position on the tank.

For operation, the float valve assembly 10 is mounted on the side of a watering tank or receptical by means of the brackets 92 and a fitting 32 of a liquid supply pipe or hose is connected to the collar 28 at the liquid inlet. The brackets 92 are so shaped that the housing 14 is suspended in the tank below the upper rim 12. When the liquid level is high, the float 80 is pivoted in a counter-clockwise direction relative to the pin 88 so that the web portion 87 is maintained in abutting relationship with the spherical end 74 of the valve actuator 64. This serves to move the actuator 64 upwardly with the valve closure element 70 in seating engagement with the valve seat 48. Such seating engagement prevents the delivery of liquid through the conduit member 26 and to the housing 14.

When the water level in the tank is lowered due to use or evaporation, the float 80 will pivot in a generally clockwise direction about the pivot 88 and the web portion 87 will be moved downwardly relative to the housing 14. Gravity acting on the valve actuator 64 and the pressure of water in the conduit 26 acting on the valve element 70 will serve to force the actuator 64 downwardly to maintain the spherical end portion 74 in abutting relationship with the web 87 on the float assembly 80. The open position of the valve will permit liquid to enter by way of the fitting 32 and to pass freely in the conduit 26 through the open end forming the outlet 36 and into the housing 14 from which it falls into the tank. When the liquid reaches its original level, the float assembly 80 will return in a counter-clockwise direction to move the valve actuator member 64 upwardly to close the valve 48, 70 to prevent the further flow of liquid.

The plurality of apertures which are disposed in the upper end of the conduit member 26 are maintained above the rim 12 of the tank. In the event that the valve 48, 70 should be in its open position and a low pressure is developed in the delivery line, siphoning of liquid from the tank is prevented and it becomes unnecessary to provide vents in the housing 14 which may be completely closed except for its bottom portion. In addition, the guide elements 50 act to direct water passing through the opening 46 and around the head portion 66 in generally downward axial direction so that the liquid is not ejected through the vent openings. It will be noted that in the up and down pivoting movement of the float assembly 80 that the rod portion 72 of the valve actuator 64 is maintained in axial alignment with the bore 34 of the conduit 26 and that the spherical end portion 74 provides a bearing surface engageable with the web portion 87 for all positions of the float assembly 80.

The embodiments of the invention in which an exclusive property or privilege is claimed are defined as follows:

1. A float valve assembly for a liquid storage tank comprising; a housing, bracket means connected to said housing and adapted to support said housing in said tank below an upper edge of the latter, float means supported by said housing for movement relative thereto in response to changes in liquid level in said tank, an elongated conduit member extending vertically relative to said mounting means and projecting above said bracket means, said conduit member forming a liquid inlet above said bracket means and a liquid outlet in said housing, valve means disposed in said conduit between said inlet and outlet and being movable between open and closed positions, an elongated actuating member axially movable in said conduit for moving said valve means between said positions, said actuating member being disposed above and having a portion resting in abutting engagement on said float means for movement upwardly to close said valve means in response to upward movement of said float means and being movable downwardly in abutting engagement with said float means upon downward movement of the latter, said actuating member being free to rotate generally about the axis of said conduit during upward and downward movement of said float means, guide means formed at spaced points axially of said actuating member and acting between said conduit and said actuating member for maintaining the latter in axial alignment in said conduit member during axial and rotational movement of said actuating member, said guide means including a plurality of annularly spaced guide elements disposed adjacent said inlet and being operable to guide said valve means into said closed position, and vent means communicating the interior of said conduit with the exterior of the latter and being disposed intermediate said valve means and said outlet.

2. The combination of claim 1 in which said guide means include guide portions forming part of said actuating member engageable with the internal walls of said conduit.

3. The combination of claim 2 in which said guide portions are positioned adjacent said outlet.

4. The combination of claim 2 in which said guide portions are fins extending radially relative to said actuating member.

5. The combination of claim 1 in which said guide elements are in the form of a plurality of longitudinally extending annularly disposed fins engageable with said valve closure member and extending longitudinally of said conduit to direct liquid axially thereof.

* * * * *